United States Patent
Fiedler

(10) Patent No.: US 12,091,571 B2
(45) Date of Patent: Sep. 17, 2024

(54) METHOD FOR IMPROVING THE CLEANABILITY OF AN EPOXY PAINT COAT ON A SURFACE

(71) Applicant: HEMPEL A/S, Kgs. Lyngby (DK)

(72) Inventor: Helle Fiedler, Kgs. Lyngby (DK)

(73) Assignee: HEMPEL A/S, Kgs. Lyngby (DK)

( * ) Notice: Subject to any disclaimer, the term of this patent is extended or adjusted under 35 U.S.C. 154(b) by 853 days.

(21) Appl. No.: 16/973,101

(22) PCT Filed: Jul. 4, 2019

(86) PCT No.: PCT/DK2019/050217
§ 371 (c)(1),
(2) Date: Dec. 8, 2020

(87) PCT Pub. No.: WO2020/007432
PCT Pub. Date: Jan. 9, 2020

(65) Prior Publication Data
US 2021/0253894 A1    Aug. 19, 2021

(30) Foreign Application Priority Data
Jul. 4, 2018  (EP) .................................... 18181698

(51) Int. Cl.
*C08L 63/00*  (2006.01)
*C08G 77/14*  (2006.01)
*C09D 163/00* (2006.01)

(52) U.S. Cl.
CPC .......... *C09D 163/00* (2013.01); *C08G 77/14* (2013.01)

(58) Field of Classification Search
CPC ...... C09D 163/00; C09D 5/08; C09D 5/1662; C08G 77/14
USPC ....................................................... 523/201
See application file for complete search history.

(56) References Cited

U.S. PATENT DOCUMENTS

| | | |
|---|---|---|
| 2004/0204551 A1 | 10/2004 | Czaplicki et al. |
| 2007/0088138 A1 | 4/2007 | Czaplicki et al. |
| 2010/0316875 A1 | 12/2010 | Lamon |
| 2011/0061568 A1 | 3/2011 | Fiedler et al. |
| 2013/0217804 A1 | 8/2013 | Campbell et al. |
| 2014/0314959 A1* | 10/2014 | Scheibel ............... C09D 7/69 523/400 |
| 2016/0083592 A1* | 3/2016 | Olsen .................. C09D 5/1693 524/588 |

FOREIGN PATENT DOCUMENTS

| | | |
|---|---|---|
| CN | 1756784 A | 4/2006 |
| CN | 101939387 A | 1/2011 |
| CN | 102382552 A | 3/2012 |
| CN | 103189411 A | 7/2013 |
| CN | 104693365 A | 6/2015 |
| CN | 106398390 A | 2/2017 |
| WO | WO 2008/130943 A2 | 10/2008 |
| WO | WO 2009/038960 A2 | 3/2009 |
| WO | WO 2012/119968 A1 | 9/2012 |
| WO | WO 2014/126599 A1 | 8/2014 |
| WO | WO 2017/140610 A1 | 8/2017 |

OTHER PUBLICATIONS

BYK USA Inc., "BYK-SILCLEAN 3701", Safety Data Sheet, Revision date Feb. 11, 2022 (Print Date May 6, 2022), pp. 1-12.
Singaporean Written Opinion dated Jul. 4, 2023 for Application No. 11202012402P.
Chen et al., "The mechanical properties and toughening mechanisms of an epoxy polymer modified with polysiloxane-based core-shell particles," Polymer, 2013, vol. 54, pp. 4276-4289.
Evonik Nutrition & Care, Technical Information, "ALBIDUR EP 2240 A", Aug. 2014.
Herrwerth et al., "Core-shell silicone elastomer particles", PCI Magazine, May 1, 2015, pp. 1-6.
International Search Report, issued in PCT/DK2019/050217, dated Aug. 23, 2019.
Written Opinion of the International Searching Authority, issued in PCT/DK2019/050217, dated Aug. 23, 2019.
Yorkgitis et al., "Siloxane-Modified Epoxy Resins", Advanced in Polymer SCI, Berlin DE, Jan. 1985, vol. 72, No. 1, pp. 79-109.
Eichenberger et al., "Influence of Core-shell Structure Organic Silicon Elastomer Technology on Performance of Epoxy Resin System" China Coatings, vol. 30, No. 5, pp. 55-59 (5 pages total), with an English translation.

* cited by examiner

*Primary Examiner* — Hannah J Pak
(74) *Attorney, Agent, or Firm* — Birch, Stewart, Kolasch & Birch, LLP

(57) ABSTRACT

A method for improving the cleanability of an epoxy paint coat on a surface is provided. A paint composition, and its use in improving cleanability is also provided. A kit-of-parts comprising the components of the paint composition is also provided.

21 Claims, No Drawings

METHOD FOR IMPROVING THE CLEANABILITY OF AN EPOXY PAINT COAT ON A SURFACE

FIELD OF THE INVENTION

The present invention relates to the field of cargo holds for solid cargos, and methods and compositions for improving their cleanability.

BACKGROUND OF THE INVENTION

Cargo holds are typically used to transport solid (i.e. bulk) cargos, rather than e.g. liquid cargos. Cargo holds must be regularly cleaned, e.g. when changing from one cargo type to another. Cargo holds must also resist the abrasion and impact which can occur when solid cargos are loaded or unloaded. Abrasion and impact can cause damage to a cargo hold coating, which then contributes negatively to the cleanability of said coating.

The specific requirements of cargo holds place corresponding requirements on the protective coatings which are present on said cargo holds. Cargo hold coatings may comprise additional components which provide improved cleanability of the coatings.

However, there is a need for additional methods for improving the cleanability of an epoxy paint coat on a surface, in particular the surface of a cargo hold, as well as paint coats for providing such properties. Such paint coats should be compatible with existing coatings and also provide good physical properties such as good abrasion resistance, good impact resistance and corrosion resistance.

Patent publications in this field include US 2010/316875 A1, WO2017/140610, WO2012/119968 and WO2008/130943. Other publications include HERRWERTH S ET AL: "Core-shell Silicone Elastomer Particles", Paint and Coatings Magazine, 1 May 2015, Evonik Nutrition & Care: "Abidur EP 2240 A", CHEN J ET AL: Polymer, vol. 54, no. 16, pages 4276-4289, and YORKGITIS EM ET AL: ADVANCED IN POLYMER SCI, BERLIN, DE, vol. 72, 1 Jan. 1985.

SUMMARY OF THE INVENTION

A method for improving the cleanability of an epoxy paint coat on a surface, is therefore provided, said method comprising the steps of:
a) applying a paint composition onto the surface thereby forming a curable paint film on the surface, which composition comprises an epoxy based binder system of:
   i. one or more epoxy resins,
   ii. one or more curing agents, and
   iii. a silicone polymer; and
b) allowing said curable paint film to cure to obtain the epoxy paint coat.

Further provided herein, is method for improving the cleanability of an epoxy paint coat on a surface, said method comprising the steps of:
a) applying a paint composition onto the surface thereby forming a curable paint film on the surface, which composition comprises an epoxy based binder system of:
   i. one or more epoxy resins,
   ii. one or more curing agents, and
   iii. a co-binder comprising a silicone polymer in an epoxy resin; and
b) allowing said curable paint film to cure to obtain the epoxy paint coat.

Further provided herein, is method for improving the cleanability of an epoxy paint coat on a surface, said method comprising the steps of:
a) applying a paint composition onto the surface thereby forming a curable paint film on the surface, which composition comprises an epoxy based binder system of:
   i. one or more epoxy resins,
   ii. one or more curing agents, and
   iii. a co-binder comprising a silicone polymer in an epoxy resin in the form of a silicone core shell rubber; and
b) allowing said curable paint film to cure to obtain the epoxy paint coat.

Further provided herein, is method for improving the cleanability of an epoxy paint coat on a surface, said method comprising the steps of:
a) applying a paint composition onto the surface thereby forming a curable paint film on the surface, which composition comprises an epoxy based binder system of:
   i. one or more epoxy resins,
   ii. one or more curing agents, and
   iii. a co-binder comprising a silicone polymer in an epoxy resin, wherein the silicone polymer constitutes at least 1.4% silicone polymer based on volume solids of the paint composition; and
b) allowing said curable paint film to cure to obtain the epoxy paint coat.

Also provided herein, is the use of a paint composition comprising component (i), component (ii) and component (iii) as defined herein for improving the cleanability of an epoxy paint coat on a surface.

Further provided herein, is a paint composition comprising component (i), component (ii) and component (iii) as defined herein.

Yet further provided herein, is a kit-of-parts for use in the method as described herein, said kit comprising a first container comprising component (i) and component (iii); and a second container comprising component (ii); or said kit comprising a first container comprising component (i); a second container comprising component (ii) and a third container comprising component (iii); wherein component (i), component (ii) and component (iii) are as defined herein.

Further details of the invention are presented in the following detailed description, the examples and the dependent claims.

DETAILED DESCRIPTION OF THE INVENTION

It has now been found that improved cleanability of an epoxy paint coat can be achieved through particular paint coat formulations. It has further been found that both improved cleanability, good abrasion resistance, good impact resistance and corrosion resistance may be obtained through particular paint coat formulations as described herein.

In a first aspect, therefore, a method for improving the cleanability of an epoxy paint coat on a surface is provided. In a second aspect, the use of a paint composition as defined herein for improving the cleanability of an epoxy paint coat on a surface is provided. A paint composition per se, and a kit-of-parts for use in the inventive method are also provided.

When a surface is provided with "improved cleanability", it means that the surface—after the treatment in question—becomes easier to clean post-soiling. Providing "improved cleanability" to a surface also means that said surface becomes less liable to pick up dirt in the first place; i.e. it becomes more resistant to soiling.

Throughout this document, volume solids (% VS) is given based on the paint composition, without solvents, i.e. the cured/dried paint.

Paint Composition

In its most general form, the paint composition of the invention comprises an epoxy based binder system of:
i. one or more epoxy resins,
ii. one or more curing agents, and
iii. a silicone polymer.

Component (iii) in the epoxy based binder system may be in the form of a silicone polymer in a particular amount such as in an amount of at least 1.4% silicone polymer based on volume solids of the paint composition. In another embodiment component (iii) may be in the form of a co-binder comprising a silicone polymer in an epoxy resin. In a particular embodiment, the epoxy resin in component (i) and in the co-binder is the same. In yet a further embodiment, component (iii) is a co-binder comprising a silicone polymer in an epoxy resin in the form of a silicone core shell rubber.

Epoxy Resins

The epoxy-based binder system comprises one or more epoxy resins. These epoxy resins are suitably selected from aromatic or non-aromatic epoxy resins (e.g. hydrogenated epoxy resins), or internally modified epoxy resins (e.g. fatty acid modified epoxy resins or other modifications to improve toughness or flexibility) containing at least one epoxy group, which is placed internally, terminally, or on a cyclic structure, together with one or more suitable curing agents to act as cross-linking agents. Combinations with reactive diluents from the classes of epoxy-functional glycidyl ethers or esters of aliphatic, cycloaliphatic or aromatic compounds can be included in order to reduce viscosity and for improved application and physical properties.

Suitable epoxy-based binder systems are believed to include epoxy and modified epoxy resins selected from bisphenol A, bisphenol F, Novolac epoxies, reactive diluents, non-aromatic epoxies, cycloaliphatic epoxies, glycidyl esters and epoxy functional acrylics or any combinations hereof.

Preferred epoxy-based binder systems comprise one or more epoxy resins selected from bisphenol A, bisphenol F, Novolac epoxies and reactive diluents selected from epoxy-functional glycidyl ethers or esters of aliphatic, cycloaliphatic or aromatic compounds.

Examples of suitable commercially available epoxy resins are:

Epikote 828, ex. Resolution Performance Products (The Netherlands), bisphenol A type Araldite GY 250, ex. Huntsman Advanced Materials (Switzerland), bisphenol A type Epikote 1004, ex. Resolution Performance Products (Germany), bisphenol A type DER 331, ex. Olin Chemicals (Germany), bisphenol A type DER 664-20, ex. Olin Chemicals (Germany), bisphenol A type Epikote 1001 X 75, ex. Resolution Performance Products (The Netherlands), bisphenol A type Araldite GZ 7071X75BD, ex. Huntsman Advanced Materials (Germany), bisphenol A type DER 352, ex. Olin Chemicals (Germany), mixture of bisphenol A and bisphenol F Epikote Resin 232, ex. Hexion (The Netherlands), mixture of bisphenol A and bisphenol F Epikote Resin 862, ex. Hexion (The Netherlands), bisphenol F type DEN 438-X 80, ex. Olin Chemical Company (USA), epoxy novolac DEN 425, ex. Olin Chemical Company (USA), epoxy novolac EPON Resin 872, ex. Hexion (The Netherlands), epoxy novolac Epikote 154, ex. Resolution Performance Products (The Netherlands), epoxy novolac Curing Agents The epoxy-based binder system comprises one or more curing agents. These are typically selected from compounds or polymers comprising at least two reactive hydrogen atoms linked to nitrogen.

Suitable curing agents are believed to include amines or amino functional polymers selected from polyamides, aliphatic amines, cycloaliphatic amines and polyamines, polyamidoamines, polyoxyalkylene amines (e.g. polyoxyalkylene diamines), aminated polyalkoxyethers (e.g. those sold commercially as "Jeffamines"), alkylene amines (e.g. alkylene diamines), aralkylamines, aromatic amines, Mannich bases (e.g. those sold commercially as "phenalkamines"), amino functional silicones or silanes, and including epoxy adducts and derivatives thereof. Examples of suitable commercially-available curing agents are:

Cardolite NC-541, ex. Cardanol Chemicals (USA), Mannich base

Cardolite NC-641, ex. Cardanol Chemicals (USA), Mannich base

Sunmide CX-65X, ex. Evonik Industries. (Singapore), Mannich base

Epikure 3140 Curing Agent, ex. Hexion (USA), polyamidoamine

Ancamide 3202, ex. Evonik Industries (Germany), polyamidoamine

Epikure 3115X-70 Curing Agent, ex. Hexion (USA), polyamidoamine

Jeffamine D-230, ex. Huntsman Advanced Materials (UK), polyamidoamine

Ancamine 2606, ex. Evonik Industries (Germany), polyoxyalkylene amine

Aradur 42BD, ex. Huntsman Advanced Materials (UK), polyoxyalkylene amine

Epoxy hardener MXDA, ex. Mitsubishi Gas Chemical Company Inc (USA), aralkyl amine Ancamine 2280, ex. Evonik Industries (Germany), polyoxyalkylene amine Diethylaminopropylamine, ex. BASF (Germany), aliphatic amine Gaskamine 240, ex. Mitsubishi Gas Chemical Company Inc (USA), aralkyl amine Cardolite Lite 2002, ex. Cardanol Chemicals (USA), Mannich base Aradur 42 BD, ex. Huntsman Advanced Materials (Germany), cycloaliphatic amine Isophorondiamin, ex. BASF (Germany), cycloaliphatic amine Epikure 3090 Curing Agent, ex. Hexion (USA), polyamidoamine adduct with epoxy Aradur 943 CH, ex. Huntsman Advanced Materials (Switzerland), alkylene amine adduct with epoxy In one aspect, the one or more curing agents comprise a polyamide and/or a polyamine. In a further aspect, the one or more curing agents comprise Mannich bases (including phenalkamines). In an alternative aspect, the one or more curing agents do not comprise Mannich bases.

Preferred epoxy-based binder systems comprise a) one or more epoxy resins selected from bisphenol A, bisphenol F, Novolac and reactive diluents selected from epoxy-functional glycidyl ethers or esters of aliphatic, cycloaliphatic or aromatic compounds; and b) one or more curing agents selected from Mannich Bases (including phenalkamines), phenalkamides, polyamidoamines, polyoxyalkylene amines, aliphatic amines, aralkylamines, polyamines, and adducts and derivatives thereof.

Preferably, the epoxy resin has an epoxy equivalent weight of 100-2000, such as 100-1500, e.g. 150-1000, such as 150-700.

Especially preferred epoxy-based binder systems comprise one or more bisphenol A epoxy resins and one or more curing agents selected from Mannich Bases (including phenalkamines), phenalkamides, polyamidoamines, aliphatic amines and adducts and derivatives thereof.

Preferred epoxy-based binder systems are ambient curing binder systems.

In the paint composition, the total amount of epoxy-based binder system is in the range of 15-80%, such as 20-60%, e.g. 25-50% by solids volume of the paint.

Without being bound to any particular theory, it is believed that the selection of the ratio between the hydrogen equivalents of the one or more curing agents and the epoxy equivalents of the one or more epoxy resins plays a certain role for the performance of the coating composition.

When used herein, the term "hydrogen equivalents" is intended to cover only reactive hydrogen atoms linked to nitrogen.

The number of "hydrogen equivalents" in relation to the one or more curing agents is the sum of the contribution from each of the one or more curing agents. The contribution from each of the one or more curing agents to the hydrogen equivalents is defined as grams of the curing agent divided by the hydrogen equivalent weight of the curing agent, where the hydrogen equivalent weight of the curing agent is determined as: grams of the curing agent equivalent to 1 mole of active hydrogen. For adducts with epoxy resins the contribution of the reactants after adductation is used for the determination of the number of "hydrogen equivalents" in the epoxy-based binder system.

The number of "epoxy equivalents" in relation to the one or more epoxy resins is the sum of the contribution from each of the one or more epoxy resins. The contribution from each of the one or more epoxy resins to the epoxy equivalents is defined as grams of the epoxy resin divided by the epoxy equivalent weight of the epoxy resin, where the epoxy equivalent weight of the epoxy resin is determined as: grams of the epoxy resin equivalent to 1 mole of epoxy groups. It should be understood that if the epoxy-based binder system contains reactive acrylic modifiers then the number of "epoxy equivalents" is to be increased accordingly. E.g. if the epoxy-based binder system contains an acrylate oligomer comprising alpha, beta unsaturated carbonyl groups then the number of "alpha, beta unsaturated carbonyl group equivalents" are to be added to the epoxy equivalents of the one or more epoxy resins for the purpose of establishing the ratio between the hydrogen equivalents of the one or more curing agents and the epoxy equivalents of the one or more epoxy resins.

Preferably, the ratio between the hydrogen equivalents of the one or more curing agents and the epoxy equivalents of the one or more epoxy resins is in the range of 20:100 to 120:100.

Especially preferred epoxy-based binder systems for use in cargo hold coatings have a ratio between the hydrogen equivalents of the one or more curing agents and the epoxy equivalents of the one or more epoxy resins in the range of 60:100 to 120:100, such as 70:100 to 110:100. Suitably, the paint composition comprises 35-80% by solids volume of the paint of such an epoxy-based binder system having a ratio between the hydrogen equivalents and the epoxy equivalents in the range of 20:100 to 120:100.

Component (iii) in the Epoxy Based Binder System

Component (iii) may be in the form of a silicone polymer in a particular amount such as in an amount of at least 1.4% silicone polymer based on volume solids of the paint composition. In yet an embodiment component (iii) may be in the form of a co-binder comprising a silicone polymer in an epoxy resin. In a particular embodiment, the epoxy resin in component (i) and in the co-binder is the same. In yet a further embodiment, component (iii) is a co-binder comprising a silicone polymer in an epoxy resin in the form of a silicone core shell rubber.

In an embodiment, the silicone polymer constitutes at least 1.6% silicone polymer based on volume solids of the paint composition, the silicone polymer constitutes at least 2.0% silicone polymer based on volume solids of the paint composition, the silicone polymer constitutes at least 2.2% silicone polymer based on volume solids of the paint composition or the silicone polymer constitutes at least 2.5% silicone polymer based on volume solids of the paint composition.

In an embodiment, the silicone polymer constitutes at the most 10% silicone polymer based on volume solids of the paint composition, wherein the silicone polymer constitutes at the most 9% silicone polymer based on volume solids of the paint composition, the silicone polymer constitutes at the most 8% silicone polymer based on volume solids of the paint composition, the silicone polymer constitutes at the most 7% silicone polymer based on volume solids of the paint composition or the silicone polymer constitutes at the most 6% silicone polymer based on volume solids of the paint composition.

In an embodiment, the silicone polymer constitutes between 1.4%-10% silicone polymer based on volume solids of the paint composition, the silicone polymer constitutes between 1.6%-9% silicone polymer based on volume solids of the paint composition, the silicone polymer constitutes between 2.0%-8% silicone polymer based on volume solids of the paint composition, the silicone polymer constitutes between 2.2%-7% silicone polymer based on volume solids of the paint composition, or the silicone polymer constitutes between 2.5%-6% silicone polymer based on volume solids of the paint composition.

In an embodiment, the silicone polymer is epoxy-functional. In another embodiment, the silicone polymer is mixed in the epoxy resin.

In an embodiment, the silicone polymer is in the form of silicone core shell rubber. In an embodiment, the silicone core shell rubber is epoxy-functional. In an embodiment, the silicone core shell rubber is mixed in the epoxy resin. In an embodiment, the epoxy-functional silicone core shell rubber has a silicone core and a plurality of epoxy surface moieties.

Component (iii) may be added in an amount of at least 4% based on volume solids of the paint composition or in an amount of at least 6% based on volume solids of the paint composition, or in an amount of at least 7% based on volume solids of the paint composition.

Component (iii) is added in an amount of at the most 25% based on volume solids of the paint composition, in an amount of at the most 20% based on volume solids of the paint composition, in an amount of at the most 17% based on volume solids or in an amount of at the most 16% based on volume solids.

Component (iii) may be added in an amount of between 4-25% based on volume solids of the paint composition, in an amount of between 6-20% based on volume solids of the paint composition or in an amount of between 7-17% based on volume solids of the paint composition.

In an embodiment, the ratio of silicone polymer:epoxy resin in component (iii) is in the range of 1:10-1:1, preferred in the range of 1:6-1:1, more preferred in the range of 1:5-1:1 and most preferred in the range of 1:4-1:1 such as 1:3-1:1.5. As an example, a silicone polymer:epoxy resin ratio of 1:3 is meant 1 part of silicone polymer and 3 parts of epoxy resin, i.e. 25% silicone polymer in an epoxy resin.

A "silicone" is synonymous with a polysiloxane, and comprises a repeating silicone-oxygen backbone (Si—O)$_n$ in which each Si atom is substituted with two organic groups. Typically the organic substituents on each Si atom are the same, and may e.g. be selected from alkyl (methyl, ethyl) or phenyl group. A particular silicone is polydimethylsiloxane (PDMS).

In an epoxy-functional silicone, the silicone polymer comprises at least one epoxy functionality, suitably two or more epoxy functionalities. These epoxy functionalities cure with the curing agent in the epoxy based binder system, thereby integrating the silicone into the binder system.

The epoxy-functional silicone may comprise one or more terminal epoxy functionalities on the silicone backbone. Additionally, or alternatively, the silicone may comprise one or more pendant epoxy functionalities on the silicone backbone.

In a particular embodiment, component (iii) is a co-binder, which comprises an epoxy-functional silicone and an epoxy resin.

In one particular aspect, component (iii) is a co-binder, which is a preparation of from bisphenol A, bisphenol F, Novolac epoxies, reactive diluents, non-aromatic epoxies, cycloaliphatic epoxies, glycidyl esters and epoxy functional acrylics or any combinations hereof and silicone rubber.

In another aspect, the silicone rubber is Siloxanes and Silicones, di-Me, 3-hydroxypropyl Me, ethers with polyethylenepolypropylene glycol mono[2-hydroxy-3-[[6-(2-oxiranylmethoxy)hexyl]oxy]propyl methyl-1,2-cyclohexanedicarboxylate (CAS-No. 869858-05-9].

In one particular aspect, component (iii) is a co-binder, which is in the form of core-shell particles.

The core-shell particles may have a core containing a crosslinked elastomeric core and a shell containing reactive groups. The core is preferably composed of polysiloxane, polybutadiene or other elastomeric material.

The reactive particles may be made by the method disclosed in U.S. Pat. No. 4,853,434 incorporated in its entirety herein by reference. U.S. Pat. No. 4,853,434 discloses reactive particles that are useful in producing fiber-reinforced plastics, structural adhesives, laminated plastics, and annealing lacquers.

The core may be crosslinked polyorganosiloxane rubber that may include dialkylsiloxane repeating units, where "alkyl" is $C_1$-$C_6$ alkyl. The core may include dimethylsiloxane repeating units.

The core-shell particles may include epoxy groups, oxitane groups, ethylenically unsaturated groups, and/or hydroxy groups. For example, the core-shell particles may include oxirane, glycidyl, vinyl ester, vinyl ether, or acrylate groups, or combinations thereof.

The core-shell particles may react with the polymer matrix that forms when the paint composition is polymerized by forming one or more chemical bonds to the polymer matrix via the reactive groups. Preferably, the reactive groups react substantially completely on curing the paint composition.

The amount of reactive particles in the paint composition may be varied as needed depending on the particular components in a given paint composition. At high concentrations of core-shell particles the paint film may become too soft and lower anti-corrosive performance may be a problem. Defoamers have been used to overcome bubble formation including DF-100 (Hanse-Chemie), SAG 1000 (OSI Specialities, Inc), FS-1265 (DOW Corning), Lodyne S100 (Source), and Surfynol DF-37 (Air Products and Chemicals).

The core-shell particles preferably have an average particle diameter of 0.01 to 50 µm, more preferably 0.1 to 5 µm.

Preferred core-shell particles that are available commercially are Albidur EP 2240 A, Albidur EP 2640, Albidur VE 3320, Albidur EP 5340, Albidur EP 5640, and Albiflex 296 (Hanse Chemie, Germany).

Although, specific examples of core/shell compositions have been given, the skilled person will appreciate that different cores can be used with different shells.

In particular, the epoxy-functional silicone may comprise a silicone core and a plurality of epoxy surface moieties. In this aspect, the core-shell particles may comprise silicone rubber and an epoxy resin. The core-shell particles may comprise a silicone core of silicone rubber. One such commercially-available product is the Albidur® nanoresin sold by Evonik Industries.

In one embodiment, component (iii) comprises an epoxy resin, which epoxy resin is one or more epoxy resins selected from the group consisting of bisphenol A, bisphenol F, Novolac epoxies, reactive diluents, non-aromatic epoxies, cycloaliphatic epoxies, glycidyl esters and epoxy functional acrylics or any combinations hereof.

In one embodiment, component (iii) comprises an epoxy-functional silicone and an epoxy resin, which epoxy resin is one or more epoxy resins selected from the group consisting of bisphenol A, bisphenol F, Novolac epoxies, reactive diluents, non-aromatic epoxies, cycloaliphatic epoxies, glycidyl esters and epoxy functional acrylics or any combinations hereof.

In a further embodiment, the epoxy resin in component (iii) is as defined in the above section.

Examples of suitable commercially-available component (iii) co-binders are:
  Abildur EP 2240 A—EVONIK INDUSTRIES, preparation of bisphenol A diglycidylether and silicone rubber
  Kane Ace MX 960—KANEKA, core-shell rubber in unmodified, liquid epoxy resin Other Constituents The paint composition may comprise plasticizers. Examples of plasticizers are hydrocarbon resins, phthalates, esters, benzoates, phosphates, paraffins, amides and benzyl alcohol. In one preferred embodiment, the paint composition comprises a hydrocarbon resin as plasticizer.

In the paint composition, the total amount of plasticizers (e.g. hydrocarbon resins) may be in the range of 0-30%, such as 0-25% by solids volume of the paint, preferably 1-25%, such as 1-20% by solids volume of the paint. In an embodiment, the total amount of plasticizers (e.g. hydrocarbon resins) may be in the range of 0-10% by solids volume of the paint.

The paint composition may comprise other paint constituents as will be apparent for the person skilled in the art. Examples of such paint constituents are pigments, fillers, additives (e.g. epoxy accelerators, surfactants, wetting agents and dispersants, de-foaming agents, catalysts, stabilizers, corrosion inhibitors, coalescing agents, thixotropic agents (such as polyamide waxes), anti-settling agents and dyes). In one aspect, therefore, the coating composition comprises one or more pigments and/or fillers.

In the paint composition, the total amount of pigments and fillers may be in the range of 0-50%, such as 5-50% by solids volume of the paint, preferably 10-45%, such as 10-40% by solids volume of the paint.

It is envisaged that certain pigments and fillers have a beneficial effect on the anticorrosive and mechanical properties. Examples are silicate containing fillers, aluminium oxide fillers (e.g. bauxite), glass flake fillers, barium sulphates and mica fillers/pigments.

In one preferred embodiment, the paint composition comprises 0-70% by solids volume of such fillers and pigments, preferably 1-60%, preferably 10-50%, such as 25-40% by solids volume of the paint.

In one preferred embodiment, the paint composition comprises 10-50% by solids volume of the paint of an aluminium pigment, bauxite or glass spheres.

In an alternative embodiment, the composition comprises at the most 40% by dry weight of the paint of such fillers and pigments.

In the paint composition, the total amount of additives may be in the range of 0-10%, such as 0.1-8% by solids volume of the paint.

The paint composition may comprise epoxy accelerators. Examples are substituted phenols, such as 2,4,6-tris (dimethylamino methyl) phenol, p-tert-butylphenol, nonyl phenol, Bisphenol A etc.

The paint composition typically comprises a solvent or solvents. Examples of solvents are alcohols, such as water, methanol, ethanol, propanol, isopropanol, butanol, isobutanol and benzyl alcohol; alcohol/water mixtures, such as ethanol/water mixtures; aliphatic, cycloaliphatic and aromatic hydrocarbons, such as white spirit, cyclohexane, toluene, xylene and naphtha solvent; ketones, such as methyl ethyl ketone, acetone, methyl isobutyl ketone, methyl isoamyl ketone, diacetone alcohol and cyclohexanone; ether alcohols, such as 2-butoxyethanol, propylene glycol monomethyl ether and butyl diglycol; esters, such as methoxypropyl acetate, n-butyl acetate and 2-ethoxyethyl acetate; and mixtures thereof.

Depending on the application technique, it is desirable that the paint comprises solvent(s) so that the solids volume ratio (SVR—ratio between the volume of solid constituents to the total volume) is in the range of 30-100%, preferably 50-100%, in particular 55-100% e.g. 60-100%.

SVR is determined according to ISO 3233 or ASTM D 2697 with the modification that drying is carried out at 20° C. and 60% relative humidity for 7 days instead of drying at higher temperatures.

Preparation of the Paint Composition

The paint may be prepared by any suitable technique that is commonly used within the field of paint production. Thus, the various constituents may be mixed together using a high speed disperser, a ball mill, a pearl mill, a three-roll mill etc. The paints according to the invention may be filtrated using bag filters, patron filters, wire gap filters, wedge wire filters, metal edge filters, EGLM turnoclean filters (ex. Cuno), DELTA strain filters (ex. Cuno), and Jenag Strainer filters (ex. Jenag), by vibration filtration, or by pressure filtration.

The paint composition to be used in the method of the invention is prepared by mixing two or more components e.g. two pre-mixtures, one pre-mixture comprising the one or more epoxy resins and one pre-mixture comprising the one or more curing agents. It should be understood that when reference is made to the paint composition, it is the mixed paint composition ready to be applied. Furthermore, all amounts stated as % by solids volume of the paint should be understood as % by solids volume of the mixed paint composition ready to be applied.

The coating composition may therefore be obtained by mixing the components of the epoxy based binder system by first combining component (i) and component (iii) followed by addition of component (ii) or by combining all three components of the epoxy based binder system.

Kit-of-Parts

The present invention also provides a kit-of-parts, suitable for use in the method described herein. The kit-of-parts comprises at least a first container and a second container.

In one aspect, the first container comprises component (i) and component (iii); while a second container comprises component (ii), wherein component (i), component (ii) and component (iii) are as defined herein.

In a second aspect, a first container comprises component (i); a second container comprises component (ii) and a third container comprises component (iii), wherein component (i), component (ii) and component (iii) are as defined herein.

With the kits set out above, curing agents and epoxy-containing components (epoxy resin and epoxy-functional silicone) can be kept separate until use.

Application of the Paint Composition

In a first general step of the method, a paint composition as defined herein is applied onto the surface, thereby forming a curable paint film on the surface. In a second general step of the method, the curable paint film is allowed to cure, to obtain the epoxy paint coat.

The paint composition of the invention is typically applied to a surface of a substrate. The term "applying" is used in its normal meaning within the paint industry. Thus, "applying" is conducted by means of any conventional means, e.g. by brush, by roller, by spraying, by dipping, etc. The commercially most interesting way of "applying" the coating composition is by spraying. Spraying is effected by means of conventional spraying equipment known to the person skilled in the art. The coating is typically applied in a dry film thickness of 50-600 µm, such as 50-500 µm, e.g. 75-400 µm.

The paint composition may be applied to any fraction of the surface. In an embodiment, the the paint composition is applied directly on the surface. In a further embodiment, a primer layer is applied to the surface prior to application of the paint composition.

The term "substrate" is intended to mean a solid material onto which the coating composition is applied. The substrate typically comprises a metal such as steel, iron, aluminium, or glass-fibre reinforced polyester. In the most interesting embodiments, the substrate is a metal substrate, in particular a steel substrate.

The term "surface" is used in its normal sense, and refers to the exterior boundary of an object. In particular, the "surface" is the surface of a cargo hold, i.e. a cargo hold for carrying solid cargos. In an embodiment, the paint composition is on the surface of a cargo hold, such as a cargo hold for carrying solid cargos.

The surface may either be the "native" surface (e.g. the steel surface). However, the substrate is typically coated, e.g. with one or more anticorrosive layers, so that the surface of the substrate is constituted by such a coating. When present, the anticorrosive coating is typically applied in a total dry film thickness of 100-600 µm, such as 150-450 µm, e.g. 200-400 µm. Alternatively, the substrate may carry a paint coat, e.g. a worn-out paint coat, or similar.

In one important embodiment, the substrate is a metal substrate (e.g. a steel substrate) coated with an anticorrosive coating such as an anticorrosive epoxy-based coating, e.g. cured epoxy-based coating, or a shop-primer, e.g. a zinc-rich shop-primer.

In one particular embodiment, the paint coat has a total dry film thickness after application and curing of 50-600 µm, such as 50-400 µm All details given above in relation to the paint composition are also relevant for the method of the present invention.

General Remarks

Although the present description and claims occasionally refer to a single component, etc., it should be understood that the coating compositions defined herein may comprise one, two or more types of the individual constituents. In such embodiments, the total amount of the respective constituent should correspond to the amount defined above for the individual constituent. The "(s)" in the expressions: compound(s), agent(s), etc. indicates that one, two or more types of the individual constituents may be present. On the other hand, when the expression "one" is used, only one (1) of the respective constituent is present.

EXAMPLES

Methods

Preparation of Test Panels

Mild steel panels of 110×300 mm, 200×300 mm and 100×100 mm are abrasive blasted to Sa 2½ (ISO 8501-1), with a surface profile equivalent to Medium (G) (ISO 8503-1). All panels are 1.5 mm in thickness. The test paints are applied by airless spray to a DTF of 200 µm.

Cargo Hold Test in Combination with Cleaning Process

The test method is performed to simulate the damage caused by coal cargo on bulk carrier's cargo hold coatings or in a rail car hopper.

Coal pieces are placed on top of the coated test panel and heated to 35° C., 45° C. or 55° C. A defined pressure is applied at different intervals relative to the time of application and moved along the coated surface at a given speed.

The standard set-up is using a coal size of 8-18 mm with a 300 kPa pressure. The coal is moved at a speed of 1.33 mm/sec.

The test is repeated 4 times with cleaning after each cycle:
a. Cleaning with water
b. Cleaning with detergent
c. No cleaning The rating of dirty coal mark left on the coated panels is reported based on the visual assessment after the last cycle according to the following rating scale:

| Coal mark after cleaning process | Rating |
|---|---|
| No coal mark left | 1 |
| Slight coal mark left | 2 |
| Dirty coal mark left | 3 |
| Markedly dirty coal mark left | 4 |

Coatings with a rating of 1 or 2 pass the test.

Abrasion Resistance Test

The test method is performed in accordance with ASTM D 4060. The test method covers the determination of the resistance of coatings to abrasion produced by the Taber Abraser on coatings applied on the test panels. The loss of weight is determined after 500 rotations and the abrading wheels are resurfaced after 50 rotations. The loss of weight is given as the mean value of 6 measurements. The wear-index is given as weight loss/1000 rotations. The temperature and humidity during testing are 23° C. and 50% relative humidity. Wheel type and load are recorded.

Impact Resistance Test

The test method is performed in accordance with ISO 6272-2/ASTM D 2794 (Falling weight test, small area intender). The impact resistance test covers a procedure for rapidly deforming by impact a coating film and its substrate, and for evaluating the effect of such deformation. The test is performed on 1.5 mm panels. After the coatings have been cured, a falling-weight of 2 pounds, with an intender-head of 0.625 in. (15.9 mm) Ø, is dropped a distance onto the test panel. The panel is supported by a steel fixture, with a hole of 0.64 in. (16.3 mm) Ø, centred under the intender. When the intender strikes the panel, it deforms the coating and the substrate. By gradually increasing the distance the weight drops, the point at which failure usually occurs can be determined. The impact value is reported as the highest impact, reproduced 5 times, which results in no visible cracks and no adhesion failure in the paint film. The impact value is calculated as the impact energy stated as inch pounds. Defects may also be detected by using a pinhole detector, low voltage (9V). A possible rupture is evaluated as cohesive or adhesive.

Salt Spray Test (SST)

This method is performed in order to assess the corrosion resistance of metallic materials with permanent or temporary corrosion protection. The neutral salt spray test applies to organic coatings on metallic materials. The operation conditions of the salt spray test are constant spray with 5% NaCl solution at 35° C. At the selected inspection intervals during and after completion of exposure, blistering and rust are evaluated on both panel and around the score (in mm from centre), according to ASTM D 714 or ISO 4628-2 and ASTM D 610 or ISO 4628-3, respectively. Cracking is evaluated according to ISO 4628-4. After completion of the exposure, adhesion is evaluated according to Hempel's knife standard or ASTM D 6677 (knife tests). Delamination and corrosion at score is evaluated according to ISO 4628-8. Period of exposure is 6 weeks.

The result is reported as blistering quantity (density) rated 0 (no blisters), 2, 3, 4, or 5 and size rated 0 (no blisters), 2, 3, 4, or 5 (see ISO 4628-2 and 4628-3 for a description of 2, 3, 4, or 5).

Model Paints

The coating compositions (see the tables further below) are prepared following the standard procedure. Part of or all the epoxy binder and solvents are charged into a can. Part of or all the additives such as thixotropic agents, wetting and dispersing agents etc. are mixed into the epoxy on a high speed dissolver equipped with an impeller disc and pre-dispersed for 5 min. Extenders and pigments are added and a temperature activation of any component that may require it (e.g. thixotropic agent) is initiated. The solid components of the coating composition are grounded by increasing the speed of the dissolver. The coating compositions are finally let down with the remaining additives, solvents and binders and the co-binder is added when the temperature of the mix is below 40° C. The rheology is adjusted with final addition of the remaining organic solvent.

The curing agent is prepared by mixing the components on a dissolver until homogeneous. If epoxy is part of the curing agent a reaction between the amine and the epoxy will happen to form an adduct. The reaction needs to be completed before the curing agent is finalised. Additives, accelerators and solvents are added by mixing.

The coating composition may be prepared by mixing two or more components e.g. two pre-mixtures, one pre-mixture comprising the one or more resins and one pre-mixture comprising the one or more curing agents.

It should be understood that the expression "% dry volume" means the percentage of the respective component based on the dry volume of the coat or of the coating composition, as the case may be. For most practical purposes (hence, unless otherwise stated), the "% dry volume" when referring to the cured coat is identical to the "% dry volume" of the coating composition.

Model Paints:

All model paints are cured with the same stoichiometric ratio between the epoxy and the active hydrogen from the amine. Solvents are added to the formulations to ease the production and to become sprayable.

Materials:
- Epikote 828 ex. Hexion
- Epikote 1001 ex—Hexion
- Disparlon 6650 ex. Kusumoto
- Minex 7 ex. Unimin
- Portalum B25 ex. Ankerpoort NV
- Bayferrox 130 M ex. Lanxess
- Cardolite NC-541-X-90 ex. Cardolite Corporation
- Laromin C260 ex. BASF Corporation
- Ancamide 350A ex. Evonik Industries
- Ancamine K 54 ex. Evonik Industries Component (iii):
- Co-binder 1: ALBIDUR EP 2240 A ex. Evonik Industries (epoxy-functional silicone core-shell particles in epoxy resin comprising 40% silicone, i.e. a silicone polymer:epoxy resin ratio of 1:1.5)
- Co-binder 2: Kane Ace MX 125 ex. KANEKA (core shell rubber of styrene-butadiene in epoxy resin)
- Co-binder 3: Kane Ace MX-156 ex. KANEKA (core shell rubber of polybutadiene in epoxy resin)
- Co-binder 4: Kane Ace MX 960 ex. KANEKA (core-shell rubber of silicone in epoxy resin comprising 25% silicone, i.e. a silicone polymer:epoxy resin ratio of 1:3)
- Co-binder 5: BYK-SILCLEAN 3701 ex. BYK Chemie

TABLE 1

Composition of model paints

| | Model paint no. | | | | | | | | |
|---|---|---|---|---|---|---|---|---|---|
| | 1 | 2 | 3 | 4 | 5 | 6 | 7 | 8 | 9 |
| Part I | | | | | | | | | |
| Epoxy binder | 42 | 34.5 | 26.5 | 34 | 25.5 | 34 | 25.5 | 34 | 25.5 |
| Co-binder 1 | | 8 | 16 | | | | | | |
| Co-binder 2 | | | | 8 | 16 | | | | |
| Co-binder 3 | | | | | | 8 | 16 | | |
| Co-binder 4 | | | | | | | | 8 | 16 |
| Rheological agents | 2.5 | 2.5 | 2.5 | 2.5 | 2.5 | 2.5 | 2.5 | 2.5 | 2.5 |
| Pigments & Extenders | 35 | 35 | 35 | 35 | 35 | 35 | 35 | 35 | 35 |
| Part II | | | | | | | | | |
| Amines | 19.5 | 19 | 19 | 19.5 | 20 | 19.5 | 20 | 19.5 | 20 |
| Epoxy accelerator | 1 | 1 | 1 | 1 | 1 | 1 | 1 | 1 | 1 |
| Total | 100 | 100 | 100 | 100 | 100 | 100 | 100 | 100 | 100 |

| | Model paint no. | | | | | | | | |
|---|---|---|---|---|---|---|---|---|---|
| | 10 | 11 | 12 | 13 | 14 | 15 | 16 | 17 | 18 |
| Part I | | | | | | | | | |
| Epoxy binder | 39 | 41 | 26 | 42 | 34.5 | 27 | 46 | 38 | 29.5 |
| Co-binder 1 | | | 19.5 | | 8 | 16 | | 9 | 18 |
| Co-binder 5 | 4 | 2 | | | | | | | |
| Rheological agents | 2.5 | 2.5 | 2.5 | 2.5 | 2.5 | 2.5 | 3 | 3 | 2.5 |
| Pigments & Extenders | 34.5 | 34 | 33 | 35 | 35 | 35 | 38.5 | 38.5 | 38.5 |
| Part II | | | | | | | | | |
| Amines | 19 | 19.5 | 18 | 19.5 | 19 | 18.5 | 11 | 10 | 10 |
| Epoxy accelerator | 1 | 1 | 1 | 1 | 1 | 1 | 1.5 | 1.5 | 1.5 |
| Total | 100 | 100 | 100 | 100 | 100 | 100 | 100 | 100 | 100 |

| Model paint no. | 19 | 20 |
|---|---|---|
| Part I | | |
| Epoxy binder | 38 | 31 |
| Co-binder 1 | 3 | 13 |
| Rheological agents | 2.5 | 2.5 |
| Pigments & Extenders | 36 | 34 |
| Part II | | |
| Amines | 19.5 | 18.5 |
| Epoxy accelerator | 1 | 1 |
| Total | 100 | 100 |

Test Results

TABLE 2

Cargo hold test at 45° C. - evaluation of cleaning with water

| Model paint Example no. | Cleaning with water |
|---|---|
| 1 | 4 |
| 2 | 1 |
| 3 | 1 |
| 4 | 4 |
| 5 | 4 |
| 6 | 4 |
| 7 | 4 |
| 8 | 2 |
| 9 | 1 |
| 10 | 1 |
| 11 | 1 |
| 12 | 1 |
| 13 | 4 |
| 14 | 1 |
| 15 | 1 |
| 16 | 4 |
| 17 | 1 |
| 18 | 1 |
| 19 | 4 |
| 20 | 1 |

The cargo hold test shows that an addition of a co-binder comprising an epoxy-functional silicone improves the cleanability with water markedly. Examples 1, 13 and 16 without the co-binder have a markedly dirty coal mark left, and examples 2, 3, 9, 10, 11 have no coal mark left.

The cargo hold test further shows that the improvement in cleanability by addition of an epoxy-functional silicone is unaffected by the choice of curing agent. Examples 1, 13 and 16 without the co-binder have a markedly dirty coal mark left, but examples 2, 14 and 17 with 8% volume solids of the co-binder and examples 3, 15 and 18 with 16% volume solids of the co-binder using three different curing agents have no coal mark left.

The cargo hold test further shows in examples 12 and 17-20 the significance of the level of the co-binder. When added in an amount of above 4% volume solids, no or a slight coal mark is left (examples 12, 17, 18, 20). Example 19 is with 3.3% volume solids of the co-binder.

TABLE 3

Cargo hold test at 45° C. - evaluation of cleaning method

| Model paint example no. | Cleaning with water | Cleaning with detergent | No cleaning |
|---|---|---|---|
| 1 | 4 | 4 | 4 |
| 2 | 1 | 1 | 2 |
| 3 | 1 | 1 | 1 |
| 8 | 2 | 2 | 3 |
| 9 | 1 | 1 | 3 |
| 10 | 1 | 1 | 2 |
| 11 | 1 | 1 | 2 |

The method of cleaning shows that compositions with the co-binder according to the invention leaves no coal mark when cleaning with water or detergent, or a slight coal mark when no cleaning of the panels.

TABLE 4

Cargo hold test at 35° C., 45° C. or 55° C. - evaluation of cargo hold test temperature — cleaning with water

| Model paint example no. | Cargo hold test at 35° C. | Cargo hold test at 45° C. | Cargo hold test at 55° C. |
|---|---|---|---|
| 1 | 4 | 4 | 4 |
| 2 | 1 | 1 | 1 |
| 3 | 1 | 1 | 1 |
| 13 | 4 | 4 | 4 |
| 14 | 1 | 1 | 1 |
| 15 | 1 | 1 | 1 |
| 16 | 4 | 4 | 4 |
| 17 | 1 | 1 | 1 |
| 18 | 1 | 1 | 1 |

The cargo hold test at different temperatures cleaning with water shows that compositions without the co-binder, independent of the curing agent, leaves a markedly dirty coal mark, whereas compositions with the co-binder according to the invention leaves no coal mark.

TABLE 5

Result of abrasion resistance test - evaluation of type of co-binder All panels were allowed to cure 1 month at room temperature

| Model paint example no. | Weight loss [mg/1000 rotations] |
|---|---|
| 1 | 84 |
| 2 | 94 |
| 4 | 100 |
| 6 | 95 |
| 8 | 103 |
| 10 | 105 |

The weight loss in the abrasion test of model paint example no. 2, 8 and 10 is comparable to the weight loss of a composition without the co-binder (example 1).

TABLE 6

Result of abrasion resistance test - evaluation
of curing agent All panels were allowed to
cure 3 weeks at room temperature. The amount
of co-binder is 16% by volume solids

| Model paint example no. | Weight loss [mg/1000 rotations] |
|---|---|
| 1 | 119 |
| 3 | 102 |
| 13 | 73 |
| 15 | 83 |
| 16 | 81 |
| 18 | 95 |

Table 6 shows that the weight loss of a composition with the co-binder is comparable to the weight of a composition without the co-binder, independent of curing agent.

TABLE 7

Result of abrasion resistance test - evaluation of the
level of co-binder using phenalkamine as curing agent

| Model paint example no. | Level of co-binder (% by volume solids) | Weight loss [mg/1000 rotations] |
|---|---|---|
| 1 | 0 | 119 |
| 19 | 3.3 | 113 |
| 2 | 8.0 | 110 |
| 20 | 13.0 | 99 |
| 3 | 16.2 | 102 |
| 12 | 19.3 | 115 |

Table 7 shows that the level of a co-binder according to the invention does not affect the weight loss.

TABLE 8

Result of impact resistance test -
evaluation of type of co-binder

| Model paint example no. | Impact value [inch pounds] |
|---|---|
| 1 | 38 |
| 3 | 45 |
| 5 | 50 |
| 7 | 50 |
| 9 | 48 |
| 11 | 46 |

Table 8 shows that the impact resistance is improved when adding a co-binder according to examples 1, 3 and 9.

TABLE 9

Result of impact resistance test -
evaluation of curing agent

| Model paint example no. | Impact value [inch pounds] |
|---|---|
| 1 | 34 |
| 3 | 40 |
| 13 | 48 |
| 15 | 45 |
| 16 | 38 |
| 18 | 24 |

Table 9 shows that the impact resistance is improved independently of the curing agent, when adding a co-binder according to the invention. Examples 1, 13 and 16 are model paints with three different curing agents (phenalkamine, polyamide and polyamine respectively), and examples 3, 15 and 18 comprises a co-binder according to the invention.

TABLE 10

Result of impact resistance test -
evaluation of the level of co-binder

| Model paint example no. | Level of co-binder (% by volume solids) | Impact value [inch pounds] |
|---|---|---|
| 1 | 0 | 34 |
| 19 | 3.3 | 32 |
| 2 | 8.0 | 38 |
| 20 | 13.0 | 36 |
| 3 | 16.2 | 40 |
| 12 | 19.3 | 38 |

Table 10 shows that the impact resistance is improved when adding a co-binder according to the invention in an amount of more than 4% by volume solids.

TABLE 11

Result of salt spray test - evaluation of co-binder

| Example no. | Level of co-binder (% by volume solids) | Blistering size/density/ distance from scribe | Rust | Rust creep [mm] Max. value | Rust creep [mm] Avg | M-Value (1) M-max. | M-Value (1) M-avg. |
|---|---|---|---|---|---|---|---|
| 22 | 7.2 | 0(S0) | Ri0 | 3.3 | 2.1 | 1.4 | 0.8 |
| 23 | 5.6 | 0(S0) | Ri0 | 3.2 | 2.8 | 1.35 | 1.15 |
| 24 | 4.0 | 0(S0) | Ri0 | 3.2 | 2.5 | 1.35 | 1.00 |
| 25 | 3.4 | 2(S4) 0-10 mm | Ri0 | 7.2 | 6.0 | 3.35 | 2.75 |

M-max = (widest measurement − 0.5)/2
M-avg = ((average of 9 values) − 0.5)/2

Example nos. 22-25 are based on a salt spray test using the commercially available product Hempadur 47500 from Hempel A/S, and adding Co-binder 1 (i.e. Albidur 2240 A) (examples 22-24) or co-binder 5 (i.e. BYK-SilClean 3701) (example 25).

The result of the salt spray test shows no blistering (0S(0)) or rust (Ri0) using example 22-24 compared to example 25, where there is a larger quantity of blisters (rated 2) of size 4. Further, the rust creep is more than halved compared to a paint comprising co-binder 5.

The invention claimed is:
1. A method for improving the cleanability of an epoxy paint coat on a surface, wherein the epoxy paint coat is on the surface of a cargo hold for carrying solid cargos, said method comprising the steps of:
   a. applying a paint composition onto the surface thereby forming a curable paint film on the surface, which the paint composition comprises an epoxy based binder system of:
      i. one or more epoxy resins,
      ii. one or more curing agents, and
      iii. a co-binder comprising a silicone polymer in an epoxy resin in the form of a silicone core shell rubber, wherein the epoxy resin of component (iii) is one or more epoxy resins selected from the group consisting of bisphenol A, bisphenol F, Novolac epoxies, reactive diluents, non-aromatic epoxides, cycloaliphatic epoxies, glycidyl esters and epoxy functional acrylics, and any combinations thereof, and the silicone core shell rubber is epoxy-functional; and b. allowing said curable paint film to cure to obtain the epoxy pain coat, wherein the silicone polymer constitutes between 1.4%-8% silicone polymer based on volume solids of the paint composition and the component (iii) is added in an amount of at least 4% based on volume solids of the paint composition.

2. The method according to claim 1, wherein the silicone polymer constitutes 1.6%-8% silicone polymer based on volume solids of the paint composition, the silicone polymer constitutes 2.0%-8% silicone polymer based on volume solids of the paint composition, the silicone polymer constitutes 2.2%-8% silicone polymer based on volume solids of the paint composition or the silicone polymer constitutes 2.5%-8% silicone polymer based on volume solids of the paint composition.

3. The method according to claim 1, wherein the silicone polymer constitutes 1.4-7% silicone polymer based on volume solids of the paint composition or the silicone polymer constitutes 1.4%-6% silicone polymer based on volume solids of the paint composition.

4. The method according to claim 1, wherein the silicone polymer constitutes between 2.0%-8% silicone polymer based on volume solids of the paint composition, the silicone polymer constitutes between 2.2%-7% silicone polymer based on volume solids of the paint composition, or the silicone polymer constitutes between 2.5%-6% silicone polymer based on volume solids of the paint composition.

5. The method according to claim 1, wherein the silicone core shell rubber is mixed in the epoxy resin.

6. The method according to claim 1, wherein the epoxy functional silicone core shell rubber has a silicone core and a plurality of epoxy surface moieties.

7. The method according to claim 1, wherein component (iii) is added in an amount of at least 6% based on volume solids of the paint composition or in an amount of at least 7% based on volume solids of the paint composition.

8. The method according to claim 1, wherein component (iii) is added in an amount of at the most 25% based on volume solids of the paint composition, in an amount of at the most 20% based on volume solids of the paint composition, in an amount of at the most 17% based on volume solids or in an amount of at the most 16% based on volume solids.

9. The method according to claim 1, wherein component (iii) is added in an amount of between 4-25% based on volume solids of the paint composition, in an amount of between 6-20% based on volume solids of the paint composition or in an amount of between 7-17% based on volume solids of the paint composition.

10. The method according to claim 1, wherein the ratio of silicone polymer:epoxy resin in component (iii) is in the range of 1:10-1:1.

11. The method according to claim 1, wherein the one or more epoxy resins of component (i) is selected from the group consisting of bisphenol A, bisphenol B, Novolac epoxies, reactive diluents, non-aromatic epoxies, cycloaliphatic epoxies, glycidyl esters and epoxy functional acrylics, and any combinations thereof.

12. The method according to claim 1, wherein the one or more curing agents is selected from the group consisting of polyamides, aliphatic amines, cycloaliphatic amines, polyamines, polyamidoamines, polyoxyalkylene amines, aminated polyalkoxyethers, aliphatic amines, aralkylamines, aromatic amines, Mannich bases, amino functional silicones or silanes, and including epoxy adducts and derivatives thereof.

13. The method according to claim 1, wherein the one or more curing agents comprises a polyamide and/or a polyamine.

14. The method according to claim 1, wherein the one or more curing agents comprises Mannich bases.

15. The method according to claim 1, wherein the one or more curing agents does not comprise Mannich bases.

16. The method according to claim 1, wherein the paint composition further comprises one or more pigments and/or fillers.

17. The method according to claim 1, wherein the paint composition further comprises a plasticizer selected from the group consisting of hydrocarbon resins, phthalates, esters, benzoates, phosphates, paraffins, amides, and benzyl alcohol.

18. The method according to claim 1, wherein the paint composition further comprises 1-7% by solids volume of the paint of an aluminium pigment, bauxite or glass spheres.

19. The method according to claim 1, wherein the paint composition is obtained by mixing the components of the epoxy based binder system by first combining component (i) and component (iii) followed by addition of component (ii) or by combining all three components of the epoxy based binder system.

20. The method according to claim 1, wherein the paint composition is applied directly on the surface.

21. The method according to claim 1, wherein a primer layer is applied to the surface prior to application of the paint composition.

* * * * *